United States Patent
Watanabe

(10) Patent No.: US 12,379,647 B2
(45) Date of Patent: Aug. 5, 2025

(54) ELECTRONIC APPARATUS

(71) Applicant: CANON KABUSHIKI KAISHA, Tokyo (JP)

(72) Inventor: Kentaro Watanabe, Tokyo (JP)

(73) Assignee: Canon Kabushiki Kaisha, Tokyo (JP)

(*) Notice: Subject to any disclaimer, the term of this patent is extended or adjusted under 35 U.S.C. 154(b) by 250 days.

(21) Appl. No.: 18/336,820

(22) Filed: Jun. 16, 2023

(65) Prior Publication Data

US 2024/0019767 A1  Jan. 18, 2024

(30) Foreign Application Priority Data

Jul. 12, 2022 (JP) .................. 2022-111884

(51) Int. Cl.
*G03B 17/02* (2021.01)
*H01H 19/14* (2006.01)

(52) U.S. Cl.
CPC ........ *G03B 17/02* (2013.01); *G03B 2217/002* (2013.01); *H01H 2019/143* (2013.01)

(58) Field of Classification Search
CPC ........ H01H 19/60–6355; G03F 3/0362; H04N 23/62; H04N 23/667; G03B 17/02
See application file for complete search history.

(56) References Cited

U.S. PATENT DOCUMENTS

| | | | | |
|---|---|---|---|---|
| 5,558,796 A | * | 9/1996 | Cho | H05B 6/68 200/5 B |
| 6,067,424 A | * | 5/2000 | Shono | G03B 17/00 200/336 |
| 10,928,070 B2 | * | 2/2021 | Morton | H05B 6/68 |

FOREIGN PATENT DOCUMENTS

JP  6945140 B2  10/2021

* cited by examiner

*Primary Examiner* — Leon W Rhodes, Jr.
(74) *Attorney, Agent, or Firm* — Canon U.S.A., Inc. IP Division

(57) ABSTRACT

An electronic apparatus includes a first rotation operation member, a second rotation operation member, a rotation member, and an exterior member. The second rotation operation member is coaxially rotatable about a rotation axis of the first rotation operation member. The rotation member rotates in accordance with a rotation of the second rotation operation member and has a rotation axis at a position different from a rotation axis of the second rotation operation member. The exterior member has a first hole part for rotatably supporting a shaft part of the first rotation operation member and a second hole part for rotatably supporting a rotation sliding part, on which the second rotation operation member slides, and a shaft part of the rotation member. In response to detection of the rotation member, a phase of the second rotation operation member is detected.

10 Claims, 9 Drawing Sheets

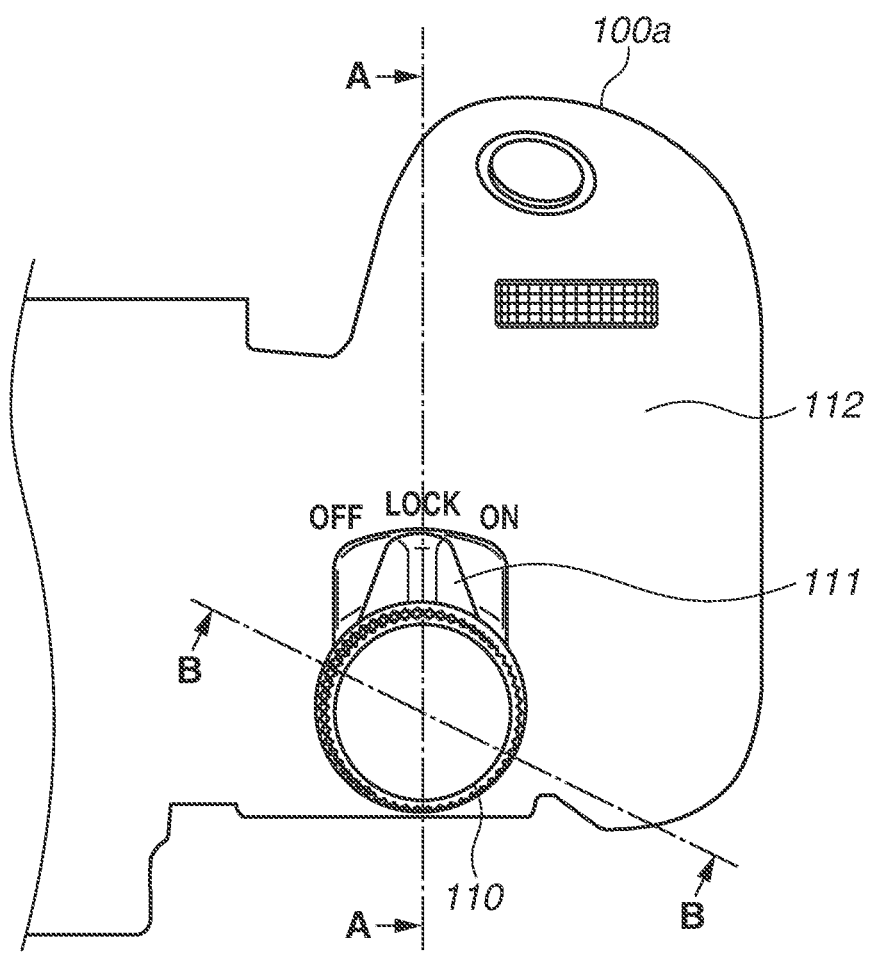

SECTION A-A

SECTION B-B

SECTION C-C

OFF POSITION

LOCK POSITION

ON POSITION

ELECTRONIC APPARATUS

BACKGROUND

Field

The present disclosure relates to an electronic apparatus including an image capturing apparatus, such as a digital camera and a digital video camera, especially the electronic apparatus including a plurality of rotation operation members disposed coaxially with each other.

Description of the Related Art

Some electronic apparatuses, such as a digital camera, have been provided with a plurality of rotation operation members rotatable independently of each other, with the increasing variety of image capturing functions to allow a user to perform selection from among the image capturing functions.

An electronic apparatus discussed in Japanese Patent No. 6945140 has a structure in which a rotation shaft of an upper rotation operation member is rotatably fit into a rotation shaft hole in an exterior member and a rotation shaft of a lower rotation operation member is rotatably supported by the exterior member in such a manner that the rotation shaft of the lower rotation operation member is aligned with the rotation shaft of the upper rotation operation member.

The exterior member has an arc-shaped vertical through opening, and a rotation position of the lower rotation operation member is detected through the opening.

In the configuration discussed in Japanese Patent No. 6945140, the arc-shaped opening is formed in the exterior member in order that rotation position of the lower rotation operation member is detected.

Due to the above described configuration, moisture may enter inside the electronic apparatus through the opening, which reduces moisture-proofness of the electronic apparatus.

The above described issue can be addressed with a moisture-proof member that is capable of sealing the opening irrespective of the rotation position of the lower rotation operation member. However, such a configuration requires a moisture-proof member covering an arc angle of about two times of the opening, which reduces space efficiency of the electronic apparatus.

Further, forming the opening may lead to lowering of a mechanical strength of the exterior member.

Consequently, measures to secure a sufficient mechanical strength are taken.

To secure the sufficient mechanical strength, a certain limitation is imposed on setting of an arc angle of the opening, which results in difficulty in securing a rotation operation angle sufficient for the lower rotation operation member.

SUMMARY

The present disclosure is directed to providing an electronic apparatus including a plurality of coaxially disposed rotation operation members even with which moisture-proofness of the electronic apparatus is not reduced, a mechanical strength of an exterior member of the electronic apparatus is not reduced, and rotation operation angles sufficient for the plurality of coaxially disposed rotation operation members are secured.

According to an aspect of the present disclosure, an electronic apparatus includes a first rotation operation member, a second rotation operation member configured to be coaxially rotatable about a rotation axis of the first rotation operation member, a rotation member configured to rotate in accordance with a rotation of the second rotation operation member, the rotation member having a rotation axis at a position different from a rotation axis of the second rotation operation member, and an exterior member configured to have a first hole part for rotatably supporting a shaft part of the first rotation operation member and a second hole part for rotatably supporting a rotation sliding part, on which the second rotation operation member slides, and a shaft part of the rotation member, wherein, in response to detection of the rotation member, a phase of the second rotation operation member is detected.

Further features of the present disclosure will become apparent from the following description of exemplary embodiments with reference to the attached drawings.

BRIEF DESCRIPTION OF THE DRAWINGS

FIG. 2 is a diagram illustrating a top view of a dial unit of the digital camera.

DESCRIPTION OF THE EMBODIMENTS

An exemplary embodiment of the present disclosure will be described below with reference to the accompanying drawings.

Front View of Digital Camera (Viewed from Object Side)

Figure 1A:
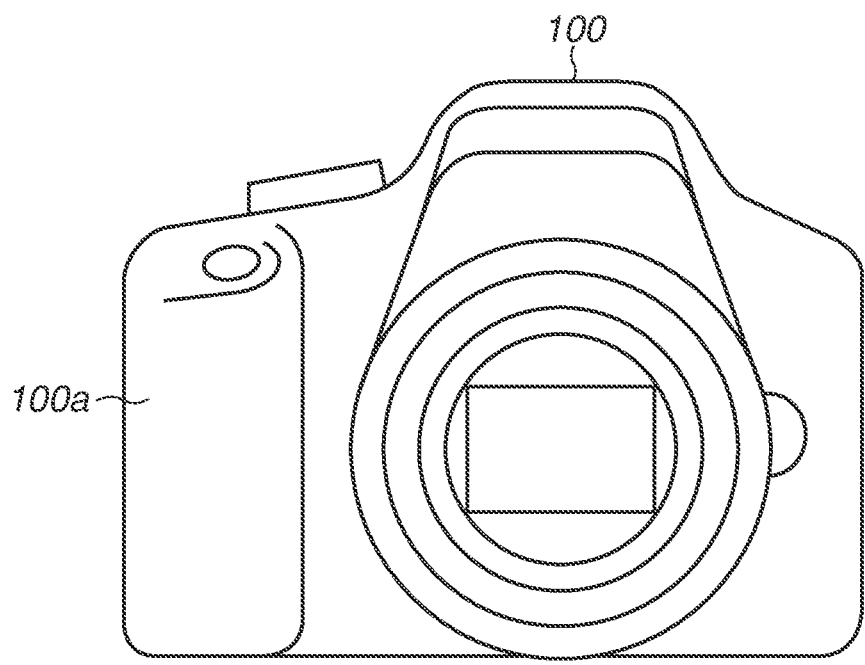
FIGS. 1A and 1B are schematic diagrams each illustrating an exterior of a digital camera serving as an example of an electronic apparatus according to the present disclosure.
Figure 1B:
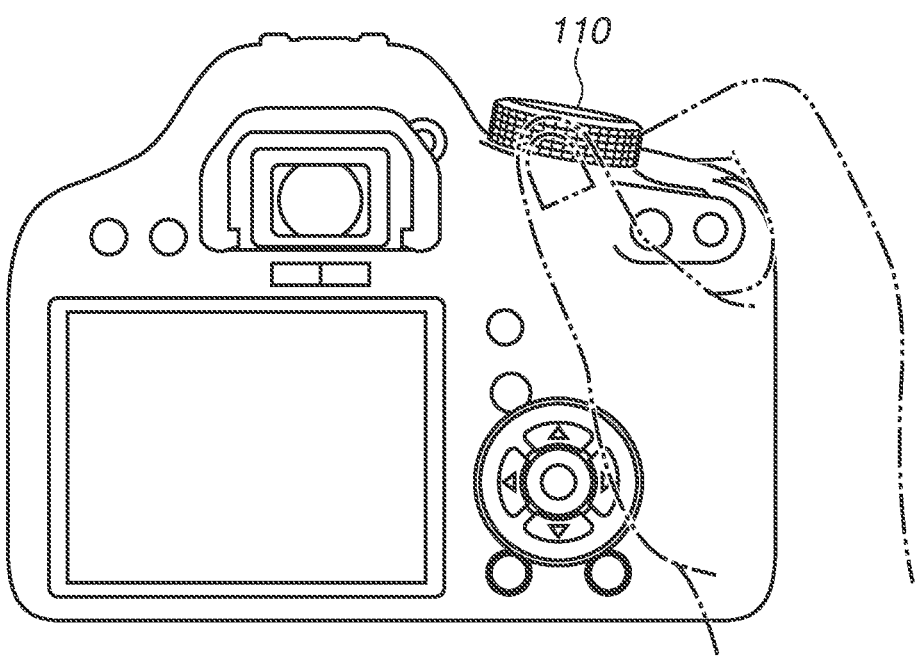

FIG. 1A is a diagram illustrating a digital camera, as an example of an exemplary embodiment of the present disclosure, viewed from the front (from the object side), and FIG. 1B is a diagram illustrating the digital camera viewed from the back (from the user side).

While, in the present exemplary embodiment, a digital camera as an example of an image capturing apparatus is employed as an electronic apparatus according to the present disclosure, the electronic apparatus is not limited to the digital camera.

As illustrated in FIG. 1A, the digital camera, hereinbelow referred to as a camera 100, in the present exemplary embodiment includes a grip part 100a that is held by a user when the user performs image capturing.

As illustrated in FIG. 1B, the camera 100 includes a dial 110 at a position where the dial 110 is operable by the user's thumb when the user holds the camera 100.

The dial 110 is a rotation operable operation member, and the user rotates the dial 110 to set image capturing conditions of the camera 100, such as a shutter speed and an aperture value.

FIG. 2 is a diagram illustrating a top view of the dial 110 of the camera 100. An exterior member 112 is an upper member of an exterior of the camera 100.

Power Switch Lever 111

As illustrated in FIG. 2, a power switch lever 111 that is coaxially rotatable about an axis of the dial 110 is disposed below the dial 110. The power switch lever 111 is movable among an OFF position, a LOCK position, and an ON position, in the order from left to right in the FIG. 2, and a power state of the camera 100 is switched between an OFF state and an ON state, and is further switched to a LOCK state in which any operation performed on the dial 110 is disabled.

The dial 110 and the power switch lever 111 are rotatably supported by the exterior member 112.

Section View of Dial 110

Figure 3:
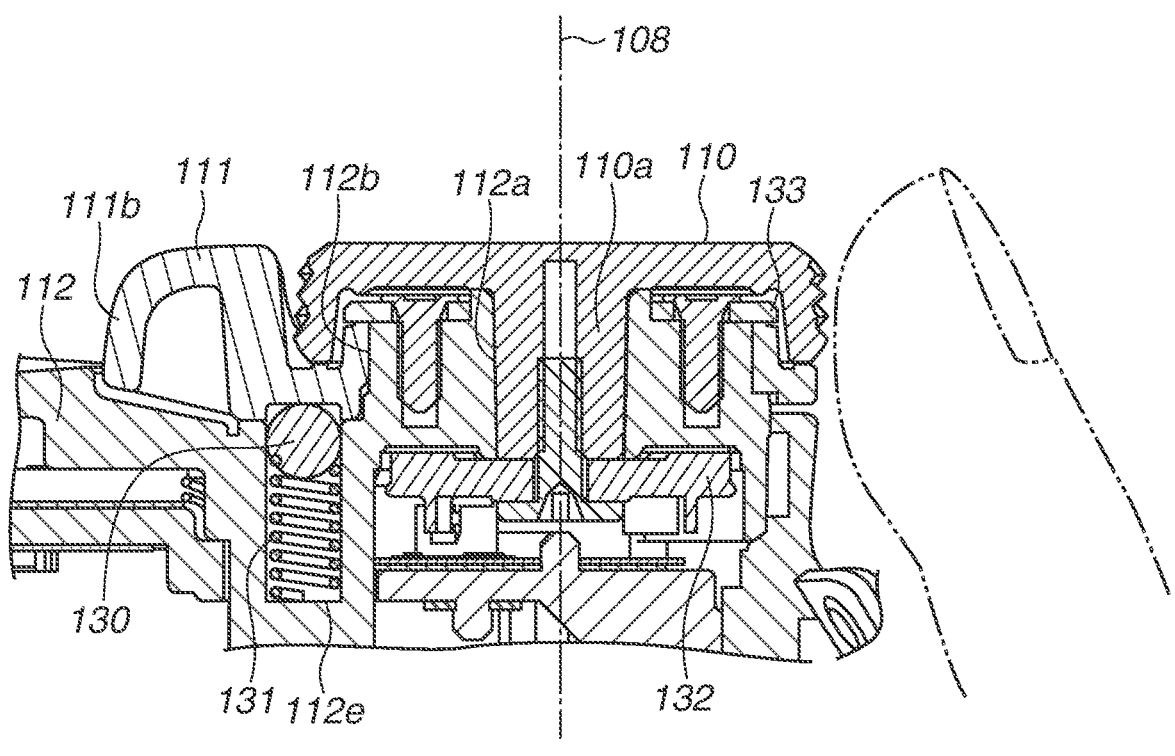
FIG. 3 is a diagram illustrating a section view of a dial, a power switch lever, and an exterior member taken along a section line A-A in FIG. 2.
Figure 4A:
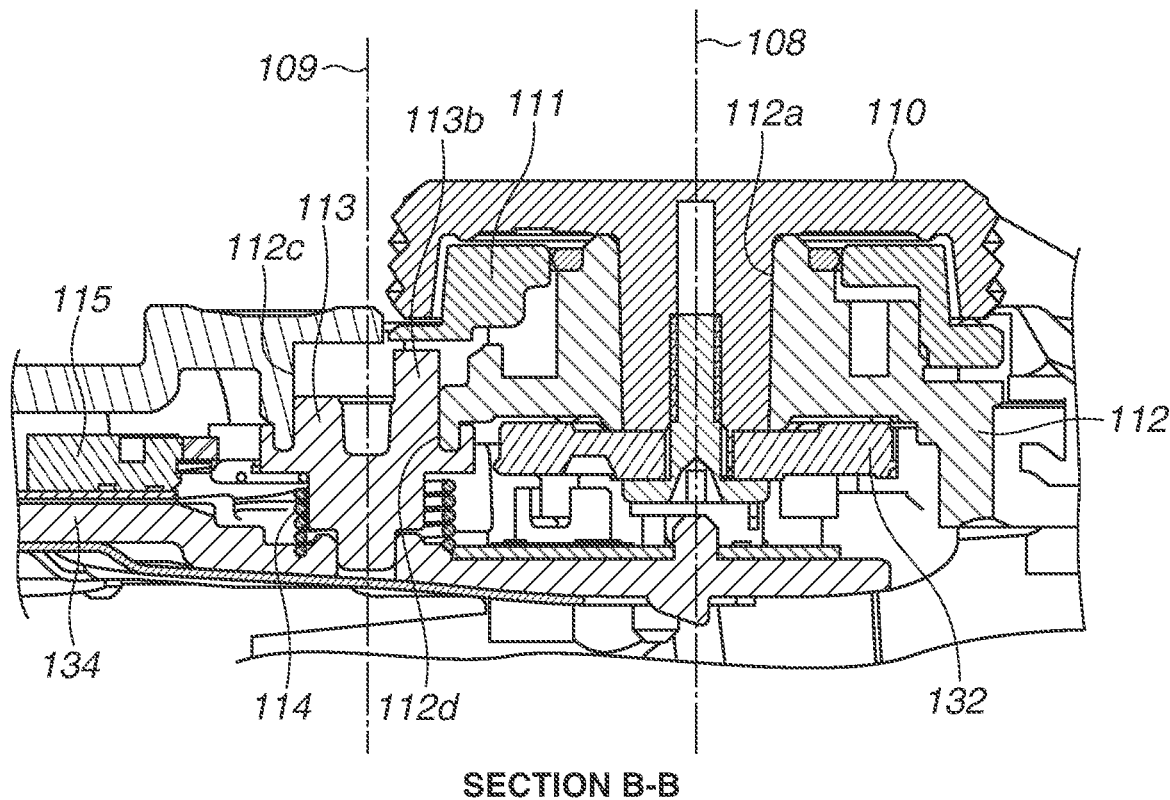
FIG. 4A is a diagram illustrating a section view of the dial, the power switch lever, the exterior member taken along a section line B-B in FIG. 2.
Figure 4B:
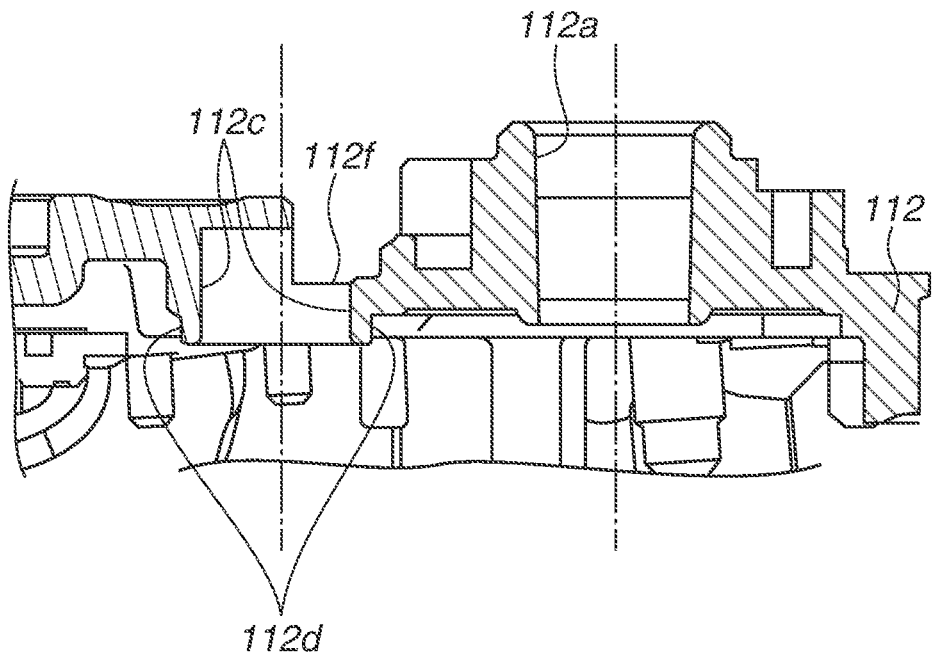
FIG. 4B is a diagram illustrating a section view of the exterior member extracted from the section view of FIG. 4A.

FIG. 3 is a section view of the camera 100 taken along a section line A-A in FIG. 2 and viewed in a direction of arrows indicated at the section line A-A. FIG. 4A is a section view of the camera 100 taken along a section line B-B in FIG. 2 and viewed in a direction of arrows indicated at the section line B-B, and FIG. 4B is a diagram of the exterior member 112 extracted from the section view in FIG. 4A while other components are omitted for the sake of simplicity of the diagram.

Exploded Perspective View of Dial 110 and Power Switch Lever 111

Figure 5A:
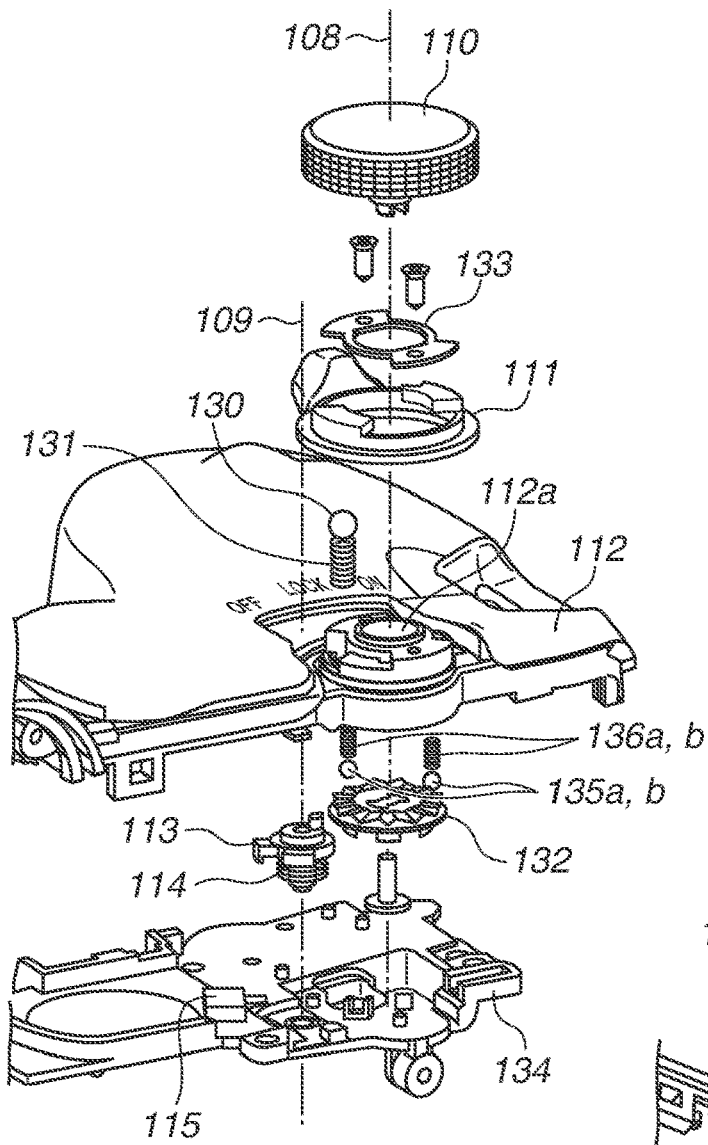
FIG. 5A is a diagram illustrating an exploded perspective view of the dial and the power switch lever viewed from diagonally above.
Figure 5B:
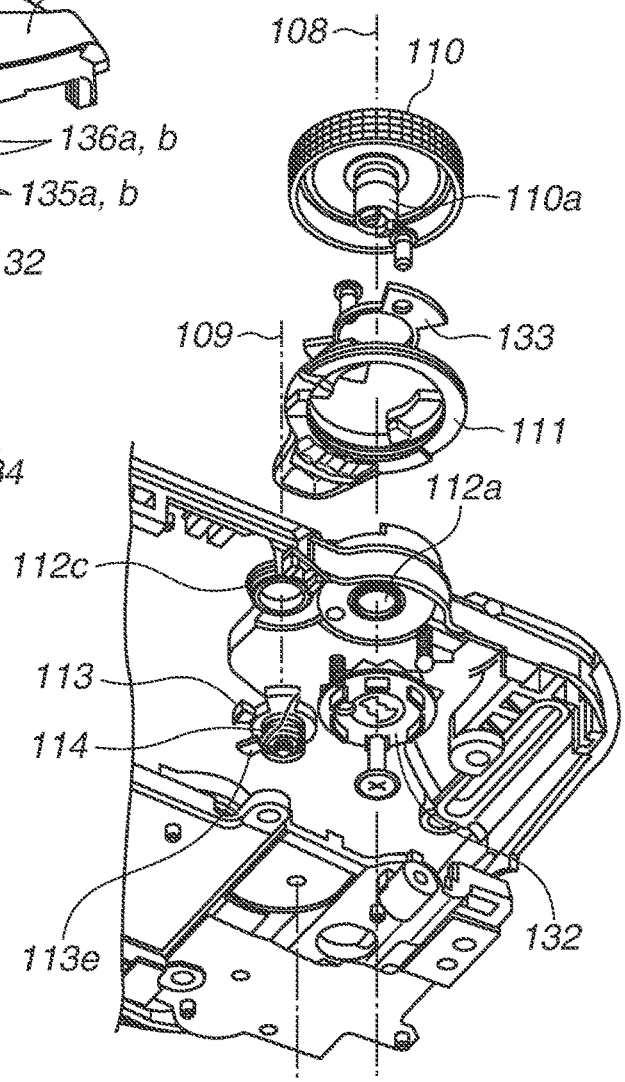
FIG. 5B is a diagram illustrating an exploded perspective view of the dial and the power switch lever viewed from diagonally below.

FIGS. 5A and 5B are diagrams each illustrating an exploded perspective view of the dial 110 and the power switch lever 111. The diagram illustrated in FIG. 5A is viewed from diagonally above, and the diagram illustrated in FIG. 5B is viewed from diagonally below.

As illustrated in FIG. 3 and FIGS. 5A and 5B, a rotation shaft 110a having a length in a direction toward the exterior member 112 is disposed at the center of the dial 110.

The rotation shaft 110a is inserted into a rotation shaft hole 112a formed as a through opening in the exterior member 112 from the outside to the inside of the camera 100, and is fastened to a phase plate 132 inside the camera 100 to be prevented from falling out.

The phase plate 132 rotates together with the dial 110 when a rotation operation is performed on the dial 110.

In the rotation operation, balls 135a and 135b and coil springs 136a and 136b produce a click feeling, and the phase plate 132 electrically reads a phase of the dial 110.

The power switch lever 111 coaxially disposed with the dial 110 is independently operable, and is disposed below the dial 110.

The power switch lever 111 is rotatably operable in forward and reverse direction within a predetermined rotation angle, and an operation part 111b operable by the user is disposed to the power switch lever 111 at a position protruded from the outside circumference of the dial 110.

A rotation center of the dial 110 is a first rotation center 108, and a rotation center of the power switch lever 111 is also the first rotation center 108.

The power switch lever 111 is held by a rotation sliding surface 112b of the exterior member 112 to be slidable about the first rotation center 108.

A ball 130 and a coil spring 131 for a click feeling that is produced when the power switch lever 111 is operated are housed in a housing part 112e in a concave form formed in the exterior member 112.

A press plate 133 fastened with a screw to the exterior member 112 restricts the vertical position of the power switch lever 111 receiving a force from the ball 130 and the coil spring 131, and the power switch lever 111 slides with the press plate 133 in a rotation operation.

As illustrated in FIGS. 4A and 4B and FIG. 5B, the exterior member 112 has a rotation shaft hole 112c in a circular form.

The rotation shaft hole 112c is partly covered by the exterior member 112 as illustrated in FIG. 4B, and the inside and the outside of the camera 100 communicate through a through part 112f not covered by the exterior member 112.

An outer circumference surface of a wall of the rotation shaft hole 112c toward the inside of the camera 100 is a wall part 112d in a concentric circle form formed as a part of the wall of the rotation shaft hole 112c.

In the rotation shaft hole 112c, a cam 113 is rotatably supported by the wall of the rotation shaft hole 112c. The vertical position of the cam 113 is restricted by a receiving plate 134 fixed to the exterior member 112 inside the camera 100.

The cam 113 receiving a force acted from a coil part of a return spring 114 serving as a torsion spring disposed at a position opposite to the exterior member 112 with respect to the cam 113 is biased toward the exterior member 112.

A switch 115 disposed in a vicinity of the cam 113 inside the camera 100 switches a power state of the camera 100 in conjunction with a movement of the power switch lever 111 via a movement of the cam 113 with a configuration described below.

The switch 115 is a detection switch capable of detecting a press operation performed from either of the right and left sides.

As illustrated in FIG. 5B, one end of the return spring 114 is latched to a latching part 113e of the cam 113 and the other end of the return spring 114 is latched to the receiving plate 134, whereby the return spring 114 applies a rotational biasing force around a second rotation center 109 to the cam 113.

Exterior Perspective View of Power Switch Lever 111

Figure 6A:
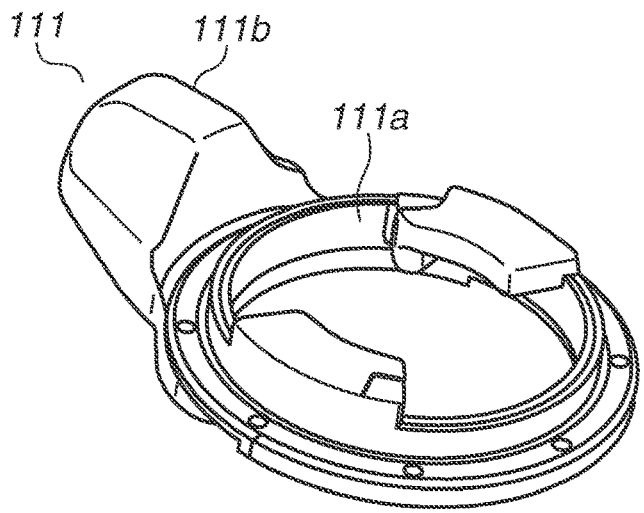
FIG. 6A is a diagram illustrating the power switch lever viewed from diagonally above.
Figure 6B:
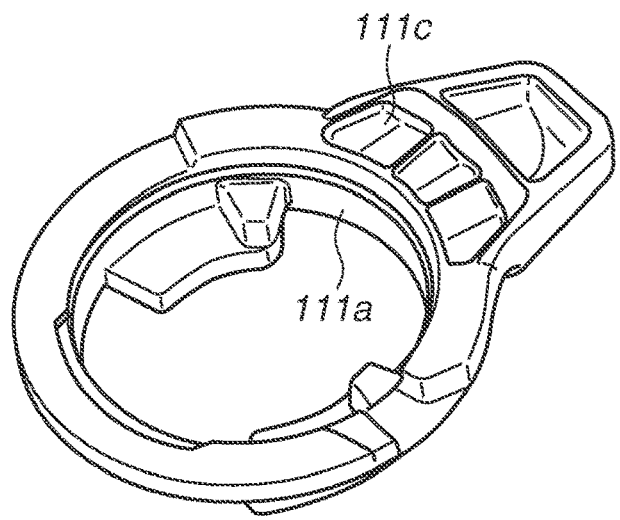
FIG. 6B is a diagram illustrating the power switch lever viewed from diagonally below.
Figure 6C:
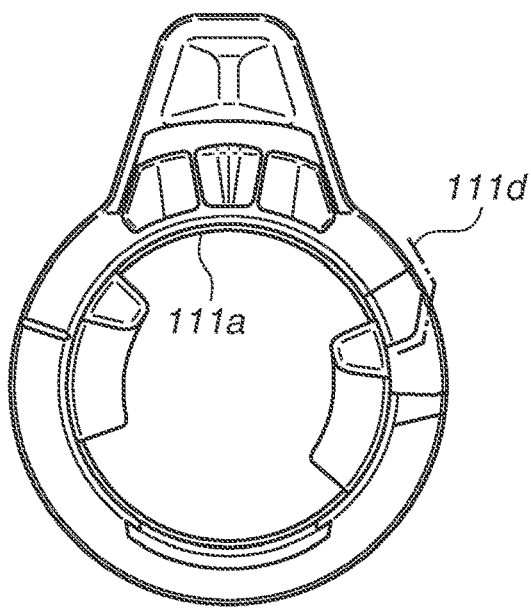
FIG. 6C is a diagram illustrating the power switch lever viewed from below.

FIGS. 6A and 6B are diagrams each illustrating an exterior perspective view of the power switch lever 111, and the FIG. 6C is a diagram illustrating the power switch lever 111 viewed from below.

The power switch lever 111 includes a rotation sliding surface 111a and the operation part 111b, as illustrated in FIGS. 6A and 6B. The rotation sliding surface 111a fitted to the rotation sliding surface 112b of the exterior member 112 is rotatably supported.

The power switch lever 111 further includes a click surface 111c in a form of peaks and valleys that produces a click feeling in response to the ball 130 being pressed and slid when the power switch lever 111 is operated.

As illustrated in FIG. 6C, the power switch lever 111 further includes a cam contact surface 111d formed from an inner diameter side of the bottom surface to the outer diameter side of the power switch lever 111.

Exterior Perspective View of Cam 113

Figure 7A:
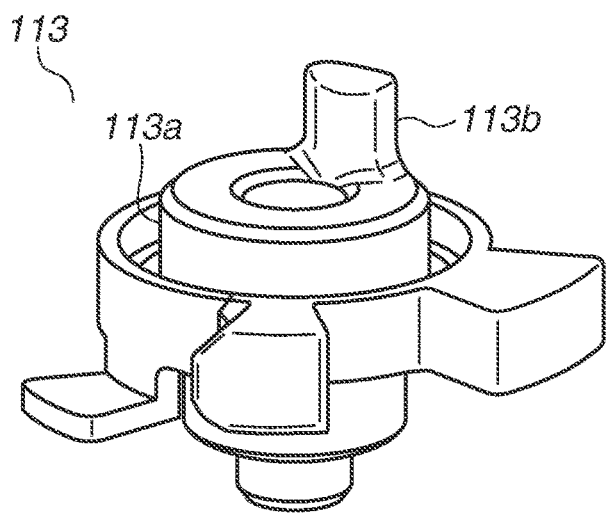
FIG. 7A is a diagram illustrating a cam viewed from diagonally above.
Figure 7B:
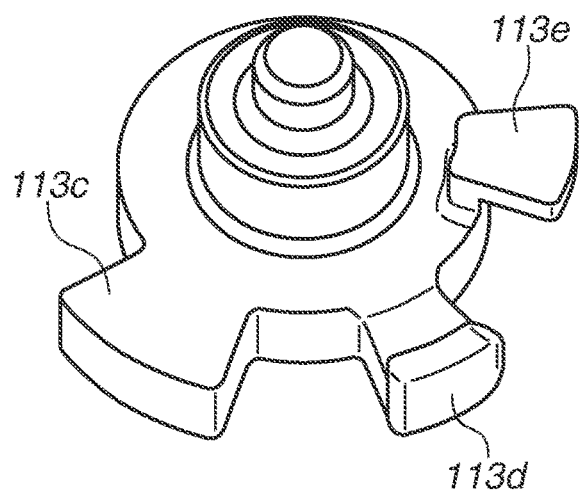
FIG. 7B is a diagram illustrating the cam viewed from diagonally below.
Figure 7C:
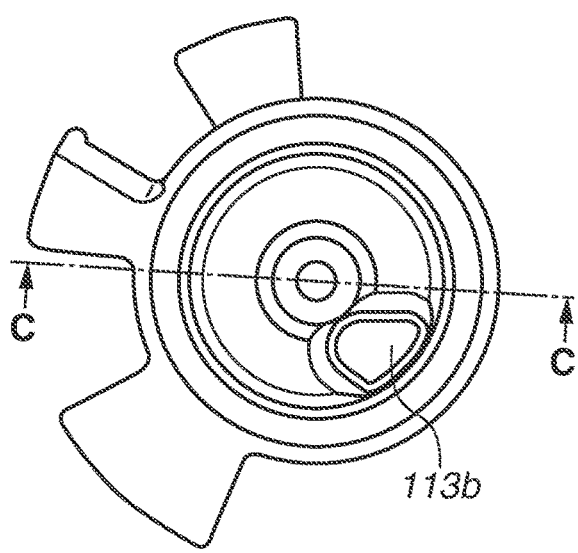
FIG. 7C is a diagram illustrating the cam viewed from above.
Figure 7D:
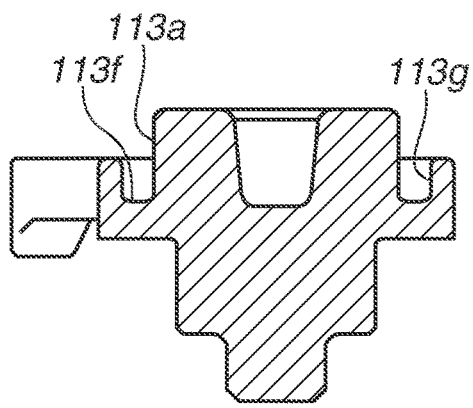
FIG. 7D is a diagram illustrating a section view of the cam taken along a section line C-C in FIG. 2C.

FIGS. 7A and 7B are diagrams each illustrating an exterior perspective view of the cam 113, the FIG. 7C is a diagram illustrating the cam 113 viewed from above, and FIG. 7D is a diagram illustrating a section view of the cam 113 taken along a section line C-C illustrated in FIG. 7C and viewed in a direction of arrows indicated at the section line C-C.

The cam 113 includes a rotation sliding surface 113a and a protrusion 113b, as illustrated in FIGS. 7A and 7B. The rotation sliding surface 113a rotatably fits to the rotation shaft hole 112c of the exterior member 112, and the protrusion 113b protrudes from the cam 113 in an outward direction from the inside of the camera 100.

When the cam 113 is installed in the rotation shaft hole 112c, the protrusion 113b is exposed outside the camera 100 through the through part 112f which is an upper part of the rotation shaft hole 112c, and faces toward the cam contact surface 111d of the power switch lever 111, as illustrated in FIG. 4A.

With the above-described configuration, the through part 112f through which the inside and the outside of the camera 100 communicate at the cam 113 is covered, which leads to an improvement in moisture-proofness of the camera 100.

The cam 113 further includes claw parts 113c and 113d and the latching part 113e, as illustrated in FIG. 7B. The claw parts 113c and 113d are parts elongated in the outer diameter direction, and the latching part 113e receives a rotation direction biasing force from the return spring 114.

As illustrated in FIG. 7D, around the rotation sliding surface 113a, an abutment part 113f serving as an abutment surface of the cam 113 biased toward the exterior member 112 by a biasing force of the coil part of the return spring 114 is formed in a consecutive concentric circle flat surface.

Around the abutment part 113f, a wall part 113g is formed as a wall directly standing from the abutment part 113f toward the exterior member 112.

Grease is applied on the rotation sliding surface 113a, the abutment part 113f, and the wall part 113g.

When the exterior member 112 is installed as illustrated in FIG. 4A, the grease functions as a lubricant for rotation of the cam 113 and also prevents moisture from intruding into the camera 100.

The rotation sliding surface 113a, the abutment part 113f, and the wall part 113g are designed in sufficiently small sizes that allow the cam 113 to rotate in a gap between the rotation shaft hole 112c of the exterior member 112 and the wall part 112d, in the first place, and thus moisture intrusion is not likely occur.

Because of the wall part 113g and the wall part 112d, a moisture intrusion route from the outside to the inside of the camera 100 is lengthened, which results in prevention of moisture intrusion.

While, in the present exemplary embodiment, moisture intrusion is prevented with application of grease, the present exemplary embodiment is not limited to it. An elastic member in a concentric circle form disposed to the abutment part 113f and compressed by the exterior member 112 can be used as a moisture-proof member. A substance having a high elastic limit, such as rubber, is used as the elastic member.

A surface treatment for moisture repellency can be performed on the abutment part 113f and the wall part 113g. An example of the moisture repellency surface treatment is that micron-level unevenness is formed on a surface of the abutment part 113f and a surface of the wall part 113g, and a fluorine coating agent is applied on the surfaces to provide moisture repellency.

Movements of Power Switch Lever 111 and Cam 113 in Power State Switching

Figure 8A:
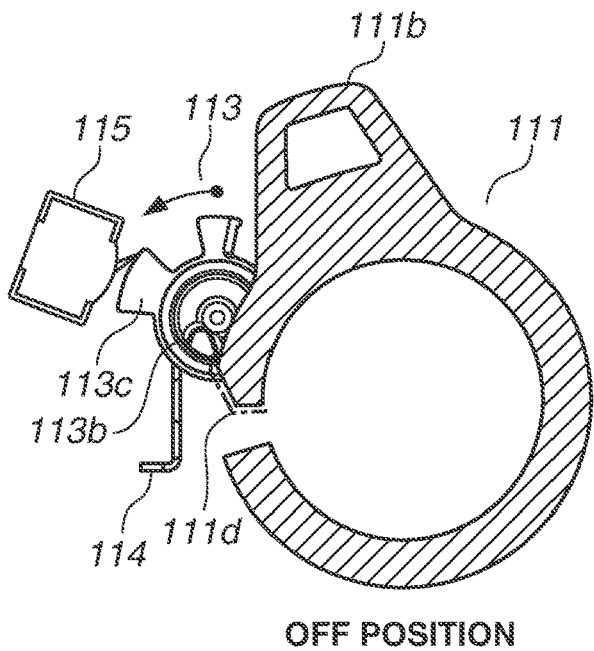
FIGS. 8A to 8B are diagrams illustrating a positional relationship among the power switch lever, the cam, and a switch, FIG. 8A illustrating a state in which the power switch lever is at an OFF position, FIG. 8B illustrating a state in which the power switch lever is at a LOCK position, and FIG. 8C illustrating a state in which the power switch lever is at an ON position.
Figure 8B:
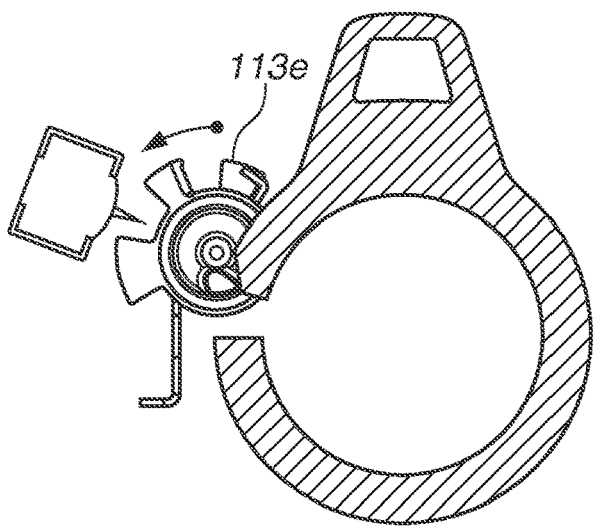
Figure 8C:
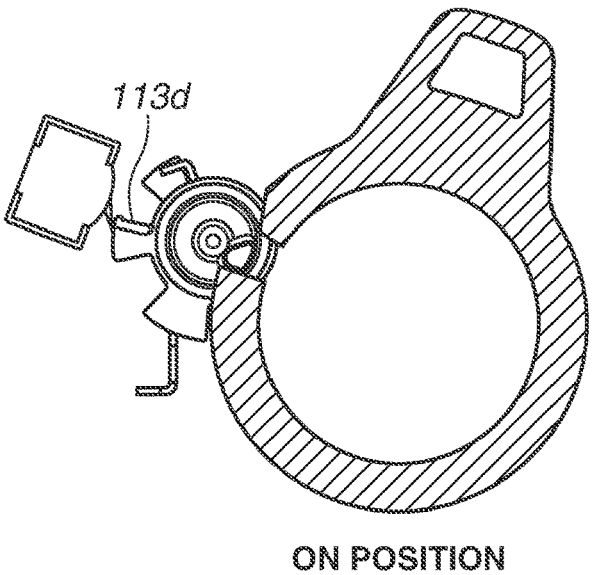

With reference to FIGS. 8A to 8C, a description will be given of movements of the power switch lever 111 and the cam 113 when the power state of the camera 100 is switched.

FIGS. 8A to 8C are diagrams illustrating positional relationships among the cam contact surface 111d of the power switch lever 111, the cam 113, and the switch 115, when the power switch lever 111 is in the OFF position, the LOCK position, and the ON position, respectively.

The power switch lever 111 in FIGS. 8A to 8C is illustrated in a cross-section view taken along a section line passing the cam contact surface 111d and orthogonally intersecting the rotation center axis, for the sake of simplicity.

When the power switch lever 111 is at the OFF position as illustrated in FIG. 8A, the protrusion 113b of the cam 113 biased by a counterclockwise biasing force of the return spring 114 indicated by an arrow to the cam contact surface 111d of the power switch lever 111 is in contact with the cam contact surface 111d.

In a state of the OFF position, the switch 115 is pushed by the claw part 113c, and the power state of the camera 100 is in the OFF state.

When the user operates the operation part 111b of the power switch lever 111 in a clockwise direction, the power switch lever 111 moves to the LOCK position illustrated in FIG. 8B.

In a transition from the state illustrated in FIG. 8A to the state illustrated in FIG. 8B, the cam 113 rotates in a counterclockwise direction while the protrusion 113b is biased by the cam contact surface 111d with the biasing force of the return spring 114.

With the rotation, the claw part 113c releases the switch 115 from the pushing.

Consequently, the power state of the camera 100 shifts to the LOCK state. When the user further operates the operation part 111b of the power switch lever 111 in the clockwise direction, the power switch lever 111 moves to the ON position illustrated in FIG. 8C.

In a state of the ON position, a mechanical stopper (not illustrated) formed in the receiving plate 134 comes into contact with the claw part 113c, whereby the cam 113 stops in a state in which the protrusion 113b is separated from the cam contact surface 111d.

Because the switch 115 is pushed by the claw part 113d in a direction opposite to the direction in the OFF state, the power state of the camera 100 shifts to the ON state.

When the power switch lever 111 is operated in a direction opposite to the above-described direction, the protrusion 113b is pushed by the cam contact surface 111d, and the cam 113 rotates in the clockwise direction against the biasing force of the return spring 114.

The rotation of the cam 113 in the clockwise direction causes the claw part 113d to release the switch 115 from the pushing in a reverse manner described above, whereby the power state of the camera 100 shifts to the LOCK state from the ON state.

In response to the operation part 111b being further operated in the counterclockwise direction, the cam 113 further rotates in the clockwise direction, and the claw part 113c pushes the switch 115, whereby the power state of the camera 100 shifts to the OFF state from the LOCK state.

The cam contact surface 111d is formed such that a rotation angle of the cam 113 is determined in accordance with a rotation angle of the power switch lever 111 as described above.

As described above, in the configuration of the present exemplary embodiment, since the cam 113 simply rotates irrespective of the power switch lever 111 being in the OFF position, the LOCK position, or the ON position, an area occupied exclusively by the rotation sliding surface 113a is constant.

Thus, the area occupied exclusively by the rotation sliding surface 113a is independent of the rotation angle of the power switch lever 111.

Consequently, the sizes of the rotation shaft hole 112c and the through part 112f which are openings in the exterior member 112 can be fixed and downsized, and thus a reduction in the mechanical strength of the exterior member 112 can be prevented.

The gap between the cam 113 and the exterior member 112 may become a moisture intrusion route as described above, however, because the rotation sliding surface 113a, the abutment part 113f, and the wall part 113g are formed in concentric circle forms, the moisture intrusion route does not change even when the cam 113 rotates.

Thus, as described above, the moisture-proofness of the camera 100 can be increased by application of grease on the rotation sliding surface 113a, the abutment part 113f, and the wall part 113g.

Diagrams for Description of Positional Relationship Between First Rotation Center 108 and Second Rotation Center 109

Figure 9A:
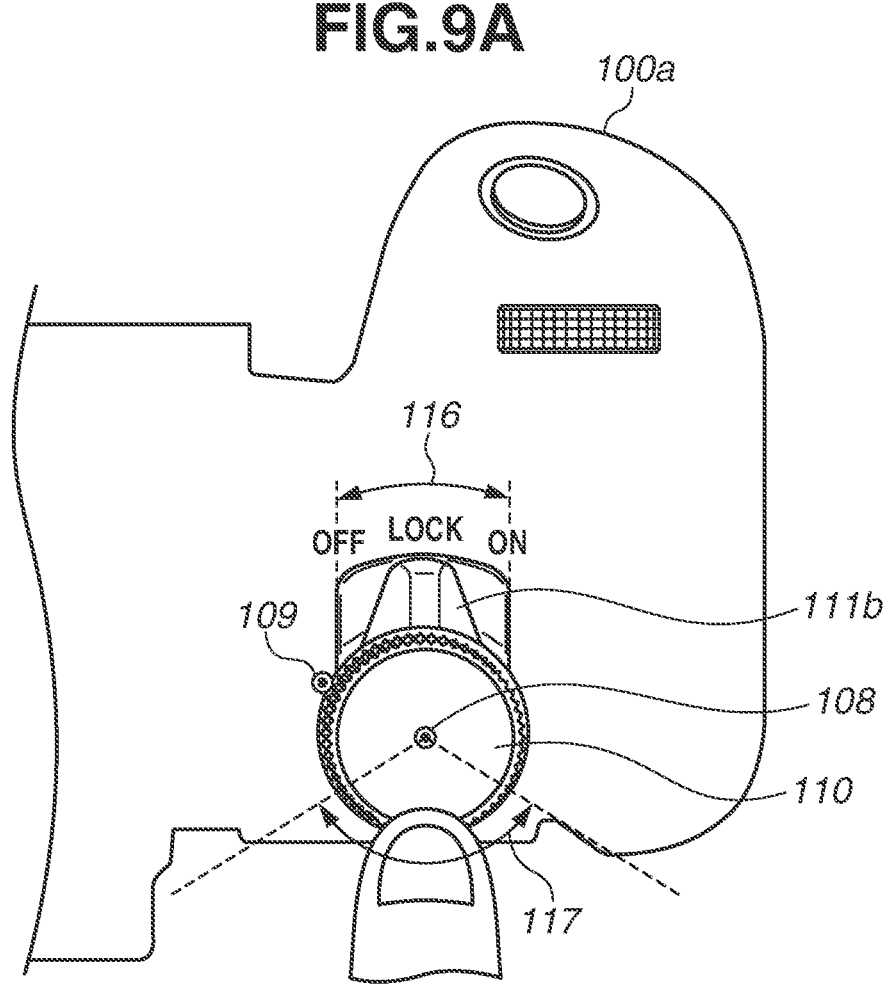
FIG. 9A is a diagram illustrating the dial unit of the digital camera viewed from above.

FIG. 9A is a diagram illustrating a positional relationship between the first rotation center 108, which is a rotation center of the dial 110 and the power switch lever 111, and the second rotation center 109, which is a rotation center of the cam 113, when the camera 100 is viewed from directly above the dial 110.

Figure 9B:
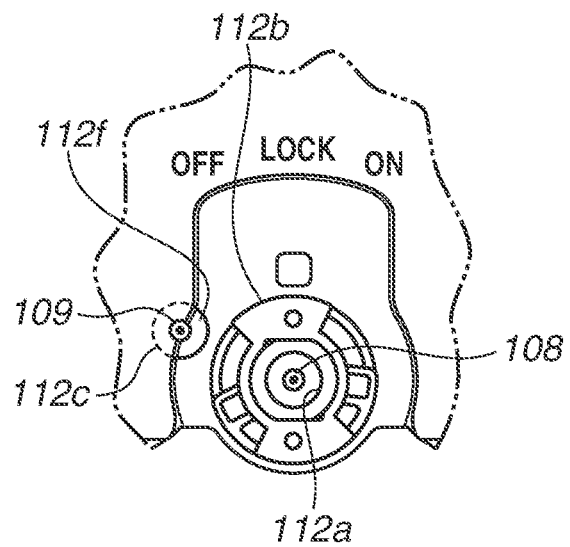
FIG. 9B is a diagram illustrating a dial installation part of the exterior member viewed from above.

FIG. 9B is a diagram illustrating an installation part, where the dial 110 is installed on the exterior member 112, viewed in the same direction as FIG. 9A.

A double arrow illustrated in FIG. 9A indicates a movement range 116 in which the operation part 111b moves between the OFF position, the LOCK position, and the ON position.

The exterior member 112 in an area corresponding to the movement range 116 is formed such that the exterior member 112 does not interfere with the operation part 111b of the power switch lever 111.

Another double arrow illustrated in FIG. 9A indicates an operation area 117 corresponding to an area where the dial 110 is operable with the user's thumb when the user operates the dial 110 with the user's thumb while holding the grip part 100a.

The exterior member 112 in an area corresponding to the operation area 117 is formed such that the exterior member 112 does not interfere with the user's finger operating the dial 110.

Thus, the exterior member 112 in the area corresponding to the operation area 117 is formed, as illustrated in the section view of FIG. 3, such that the exterior member 112 does not extend beyond an outer form of the dial 110 in a direction in which the user's finger touches the dial 110.

The second rotation center 109 which is the rotation center of the cam 113 is disposed at a position different from the first rotation center 108, and the position is not within the movement range 116 and the operation area 117.

Such an arrangement of the second rotation center 109 allows a part of the upper part of the rotation shaft hole 112c to be covered with the exterior member 112 as illustrated in FIG. 9B.

Because the through part 112f is also covered by installing the power switch lever 111 and the dial 110, the cam 113 is not easily observed from the outside of the camera 100, which is desirable in view of the aesthetic appearance of the camera 100.

Furthermore, dust can be prevented from intruding inside the camera 100 from the outside to the cam 113.

The second rotation center 109 is disposed at a position outward from the rotation sliding surface 112b of the exterior member 112 holding the power switch lever 111 in a rotatable manner, as illustrated in FIG. 9B.

This arrangement enables the cam 113 and the phase plate 132 to be disposed in a parallel arrangement without placing the cam 113 and the phase plate 132 in the vertical direction, as illustrated in FIG. 4A.

Thus, the structure relating to the dial 110 and the power switch lever 111 inside the camera 100 can be configured in a thin form and a small size in the vertical direction.

In the present exemplary embodiment, the switch 115 capable of detecting a pressing operation performed from either of the right and left sides is employed as position detection means.

Instead of the switch 115, an optical detection sensor, such as a photointerrupter, and other various detection methods can also be used.

An outline of the present exemplary embodiment will be described below.

A description will be given with reference to FIGS. 4A and 4B and FIGS. 5A and 5B.

The electronic apparatus according to the present exemplary embodiment includes the dial (first rotation operation member) 110 and the power switch lever (second rotation operation member) 111 coaxially rotatable about the first rotation center (rotation axis) 108 of the first rotation operation member 110.

The electronic apparatus according to the present exemplary embodiment further includes the cum (rotation member) 113 that rotates in accordance with a rotation of the second rotation operation member 111 and has the second rotation center (rotation axis) 109 at a position different from the rotation axis 108 of the second rotation operation member 111.

The electronic apparatus according to the present exemplary embodiment further includes the exterior member 112 having the rotation shaft hole (first hole part) 112a for rotatably supporting a shaft part of the first rotation operation member 110 and the rotation shaft hole (second hole part) 112c for rotatably supporting the rotation sliding surface (rotation sliding part) 112b, on which the second rotation operation member 111 slides, and a shaft part of the rotation member 113.

In response to detection of a rotation of the rotation member 113, a phase of the second rotation operation member 111 is detected.

The electronic apparatus according to the present exemplary embodiment further includes a switch (position detection unit) 115 for detecting a rotation position of the second rotation operation member 111, the protrusion (outside protrusion cam part) 113b protruded from the rotation member 113 to the outside of the electronic apparatus through the exterior member 112, and claw parts (inside protrusion parts) 113c and 113d protruded from the rotation member 113 to the inside of the electronic apparatus.

In the electronic apparatus according to the present exemplary embodiment, the rotation member 113 rotates by the second rotation operation member 111 coming into contact with the outside protrusion cam part 113b, and the position detection unit 115 detects a rotation of the inside protrusion parts 113c and 113d of the rotation member 113.

A description will be given with reference to FIG. 5A and FIG. 5B and FIGS. 7A to 7D.

The electronic apparatus according to the present exemplary embodiment includes the return spring (biasing member) 114 for biasing the rotation member 113 toward the exterior member 112 in the rotation direction.

The abutment part 113f as at least a part of a contacting surface of the rotation member 113 that comes into contact with the exterior member 112 by the biasing member 114 is formed in a consecutive concentric circle form about the rotation shaft center of the rotation member 113.

A description will be given with reference to FIGS. 7A to 7D.

The rotation member 113 includes the wall part 113g formed in a consecutive concentric circle form along a direction of the rotation axis 109 of the rotation member 113 from the contacting surface of the rotation member 113.

A description will be given with reference to FIGS. 7A to 7D and FIGS. 8A to 8C.

An elastic member in a concentric circle form is disposed to the contact surface of the rotation member 113.

A moisture repellent member is disposed between the rotation member 113 and the exterior member 112.

At least one of a surface of the rotation member 113 and a surface of the exterior member 112 has been subjected to moisture repellent treatment.

A description will be given with reference to FIGS. 9A and 9B.

A center position of the second hole part 112c in the exterior member 112 is disposed at a position outward from the rotation sliding part 112b, when viewed in the direction of the rotation axis 108 of the second rotation operation member 111.

A description will be given with reference to FIGS. 4A and 4B.

The outside protrusion cam part 113b of the rotation member 113 is covered by any of the exterior member 112, the first rotation operation member 110, and the second rotation operation member 111, when viewed in the direction of the rotation axis 108 of the second rotation operation member 111.

A description will be given with reference to FIGS. 9A and 9B.

The electronic apparatus according to the present exemplary embodiment includes an operation part 111b disposed at a position protruded from the outer circumference of the first rotation operation member 110.

The second hole part 112c in the exterior member 112 is disposed at a position outside the movement range 116 of the second rotation operation member 111, when viewed in the direction of the rotation axis 108 of the second rotation operation member 111.

The second hole part 112c in the exterior member 112 is disposed at a position outside the operation area 117 where the user holding the grip part 100a fixed to the exterior member 112 is capable of operating the first rotation operation member 110 with a user's thumb.

While the exemplary embodiment of the present disclosure has been described above, the present disclosure is not limited thereto but can be modified and changed in diverse ways within the scope of the appended claims.

According to the present disclosure, it is possible to provide an electronic apparatus including a plurality of coaxially disposed rotation operation members even with which moisture-proofness of the electronic apparatus is not reduced, a mechanical strength of an exterior of the electronic apparatus is not reduced, and rotation operation angles sufficient for the plurality of coaxially disposed rotation operation members are secured.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-111884, filed Jul. 12, 2022, which is hereby incorporated by reference herein in its entirety.

What is claimed is:

1. An electronic apparatus comprising:
   a first rotation operation member;
   a second rotation operation member configured to be coaxially rotatable about a rotation axis of the first rotation operation member;
   a rotation member configured to rotate in accordance with a rotation of the second rotation operation member, the rotation member having a rotation axis at a position different from a position of a rotation axis of the second rotation operation member; and
   an exterior member including a first hole part for rotatably supporting a shaft part of the first rotation operation member, a second hole part for rotatably supporting the rotation member and a sliding surface on which the second rotation operation member slides,
   wherein, in response to detection of the rotation member, a phase of the second rotation operation member is detected.

2. The electronic apparatus according to claim 1, further comprising:
   a position detection unit configured to detect a rotation position of the second rotation operation member;

an outside protrusion cam part of the rotation member, the outside protrusion cam part being configured to protrude to an outside of the electronic apparatus through the exterior member; and an inside protrusion part of the rotation member, the inside protrusion part being configured to protrude to an inside of the electronic apparatus, wherein the rotation member rotates by the second rotation operation member being in contact with the outside protrusion cam part, and wherein the position detection unit detects a rotation of the inside protrusion part of the rotation member.

3. The electronic apparatus according to claim 2, further comprising a biasing member configured to bias the rotation member toward the exterior member in a direction of the rotation axis of the rotation member, wherein at least a part of a contact surface of the rotation member where the rotation member is biased to be into contact with the exterior member by the biasing member is formed in a consecutive concentric circle about the rotation axis of the rotation member.

4. The electronic apparatus according to claim 3, wherein the rotation member includes a wall part formed in a consecutive concentric circle along the direction of the rotation axis of the rotation member from the contact surface of the rotation member.

5. The electronic apparatus according to claim 4, further comprising an elastic member formed in a concentric circle disposed on the contact surface of the rotation member.

6. The electronic apparatus according to claim 4, wherein a moisture repellent member having moisture repellent property is disposed between the rotation member and the exterior member.

7. The electronic apparatus according to claim 6, wherein at least one of a surface of the rotation member and a surface of the exterior member has been subjected to moisture repellent treatment.

8. The electronic apparatus according to claim 2, wherein, when viewed in a direction of the rotation axis of the second rotation operation member, the outside protrusion cam part of the rotation member is covered by any of the exterior member, the first rotation operation member, and the second rotation operation member.

9. The electronic apparatus according to claim 1,
wherein the second rotation operation member includes an operation part at a position protruded from an outer circumference of the first rotation operation member, and wherein, when viewed in a direction of the rotation axis of the second rotation operation member, a center position of the second hole part in the exterior member is disposed at a position which is outside a movable range of the operation part.

10. The electronic apparatus according to claim 9,
wherein, when viewed in the direction of the rotation axis of the second rotation operation member, the second hole part in the exterior member is disposed outside an operation area where a user holding a grip part fixed to the exterior member is capable of operating the first rotation operation member with a user's thumb.

* * * * *